US009621232B2

(12) United States Patent
Tsuzuki

(10) Patent No.: US 9,621,232 B2
(45) Date of Patent: Apr. 11, 2017

(54) COMMUNICATION DEVICE CAPABLE OF EXECUTING WIRELESS COMMUNICATION OF NFC SCHEME ACCORDING TO NFC STANDARD

(71) Applicant: Brother Kogyo Kabushiki Kaisha, Nagoya-shi, Aichi-ken (JP)

(72) Inventor: Ryosuke Tsuzuki, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 60 days.

(21) Appl. No.: 14/580,410

(22) Filed: Dec. 23, 2014

(65) Prior Publication Data

US 2015/0188611 A1 Jul. 2, 2015

(30) Foreign Application Priority Data

Dec. 27, 2013 (JP) ................................ 2013-271480

(51) Int. Cl.
*H04B 5/00* (2006.01)
*H04B 5/02* (2006.01)

(52) U.S. Cl.
CPC ............ *H04B 5/02* (2013.01); *H04B 5/0031* (2013.01); *H04B 5/0056* (2013.01)

(58) Field of Classification Search
CPC ....... H04B 5/02; H04B 5/0031; H04B 5/0056
USPC ..................................... 455/41.1, 41.2, 41.3
See application file for complete search history.

(56) References Cited

U.S. PATENT DOCUMENTS 8,855,557 B2 * 10/2014 Moosavi ................. H04B 5/00 455/41.1
8,855,563 B2 10/2014 Yamaoka et al.
9,071,971 B2 6/2015 Caceres et al.
9,106,781 B2 8/2015 Suzuki et al.
9,191,528 B2 * 11/2015 Kato ................. H04N 1/00217
2010/0022187 A1 1/2010 Ohkita
(Continued)

FOREIGN PATENT DOCUMENTS

JP 2005-059496 A 3/2005
JP 2010-028666 A 2/2010
(Continued)

OTHER PUBLICATIONS

Nov. 6, 2015—(US) Notice of Allowance—U.S. Appl. No. 14/228,425.

(Continued)

*Primary Examiner* — Nay A Maung
*Assistant Examiner* — Angelica M Perez
(74) *Attorney, Agent, or Firm* — Banner & Witcoff, Ltd.

(57) ABSTRACT

A communication device may comprise a first interface used by executing a wireless communication. The communication device may perform: in a case where a first connection via the first interface is established with the portable terminal under a circumstance where the communication device is in an error state, sending related information to the portable terminal by using the first connection via the first interface, the related information being related to the error state; and in a case where a second connection via the first interface is established with the portable terminal under a circumstance where the communication device is in a non-error state, sending different information to the portable terminal by using the second connection via the first interface, the different information being different from the related information.

13 Claims, 5 Drawing Sheets

(56) References Cited

U.S. PATENT DOCUMENTS

| | | | |
|---|---|---|---|
| 2011/0230138 | A1 | 9/2011 | Ohkita |
| 2012/0164944 | A1 | 6/2012 | Yamaoka et al. |
| 2013/0084803 | A1 | 4/2013 | Hall et al. |
| 2013/0258390 | A1 | 10/2013 | Suzuki et al. |
| 2013/0260683 | A1 | 10/2013 | Suzuki et al. |
| 2013/0260684 | A1 | 10/2013 | Suzuki et al. |
| 2014/0168687 | A1 * | 6/2014 | Kim .................. H04N 1/00342 358/1.14 |
| 2014/0213190 | A1 | 7/2014 | Yamaoka |
| 2014/0335784 | A1 | 11/2014 | Ozenne et al. |
| 2014/0349577 | A1 | 11/2014 | Matsuda |
| 2015/0317116 | A1 | 11/2015 | Suzuki et al. |

FOREIGN PATENT DOCUMENTS

| | | | |
|---|---|---|---|
| JP | 2011-044092 | A | 3/2011 |
| JP | 2013-187567 | A | 9/2013 |
| JP | 2013-214805 | A | 10/2013 |
| JP | 2013214139 | A | 10/2013 |
| WO | 2012/004939 | A1 | 1/2012 |

OTHER PUBLICATIONS

Jul. 16, 2015—(US) Non-Final Office Action—U.S. Appl. No. 14/228,425.

"Wi-Fi Peer-to-Peer (P2P) Technical Specification, Version 1.1", Wi-Fi Alliance Technical Committee P2P Task Group, 2010, 159 pages.

Wi-Fi Alliance Technical Committee P2P Task Group, "Wi-Fi Peer-to-Peer (P2P) Technical Specification", Version 1.1, pp. 1-159.

Sep. 8, 2016—(US) Non-Final Office Action—U.S. Appl. No. 15/066,053.

Jan. 31, 2017—(JP) Notification of Reasons for Rejection—App 2013-271480.

* cited by examiner (Case A; Non-Error State → Error State)

COMMUNICATION DEVICE CAPABLE OF EXECUTING WIRELESS COMMUNICATION OF NFC SCHEME ACCORDING TO NFC STANDARD

CROSS-REFERENCE TO RELATED APPLICATIONS

This application claims priority to Japanese Patent Application No. 2013-271480, filed on Dec. 27, 2013, the contents of which are hereby incorporated by reference into the present application.

TECHNICAL FIELD

A technique disclosed in the present specification relates to a communication device capable of executing a wireless communication. Alternatively, a technique disclosed in the present specification relates to a communication device capable of executing a wireless communication of an NFC (abbreviation of Near Field Communication) scheme according to an NFC standard.

DESCRIPTION OF RELATED ART

An information processing device is known that comprises an interface to which an NFC device is connected. The information processing device switches an operation mode of the NFC device depending on whether the information processing device itself is in a power-saving state or a normal operation state. This enables the information processing device to execute an NFC communication corresponding to the state of the information processing device itself with a communication terminal by using the NFC device.

SUMMARY

The present specification provides a new technique that may send appropriate information according to a state of a communication device to a portable terminal by using a wireless communication of an NFC scheme.

A communication device may comprise: a first interface used by executing a wireless communication of an NFC (abbreviation of Near Field Communication) scheme according to an NFC standard; a processor; and a memory storing computer-readable instructions therein. The computer-readable instructions, when executed by the processor, may cause the communication device to perform: in a case where a first connection via the first interface is established with a portable terminal under a circumstance where the communication device is in an error state, sending related information to the portable terminal by using the first connection via the first interface, the related information being related to the error state; and in a case where a second connection via the first interface is established with the portable terminal under a circumstance where the communication device is in a non-error state, sending different information to the portable terminal by using the second connection via the first interface, the different information being different from the related information.

Alternatively, the present specification provides a new technique that may send appropriate information according to a state of a communication device to a portable terminal by using a wireless communication.

A communication device may comprise: a first interface used by executing a wireless communication of a first communication scheme; a second interface used by executing a wireless communication of a second communication scheme being different from the first communication scheme; a processor; and a memory storing computer-readable instructions therein. The computer-readable instructions, when executed by the processor, may cause the communication device to perform: in a case where a first connection via the first interface is established with a portable terminal under a circumstance where the communication device is in an error state, sending related information to the portable terminal by using the first connection via the first interface, the related information being related to the error state; and in a case where a second connection via the first interface is established with the portable terminal under a circumstance where the communication device is in a non-error state, sending a wireless profile to the portable terminal by using the second connection via the first interface, the wireless profile being used by the communication device and the portable terminal to execute a wireless communication via the second interface, and establishing, by using the wireless profile, a wireless connection between the communication device and the portable terminal via the second interface.

A control method for implementing the communication device, computer-readable instructions, and a non-transitory computer-readable medium storing the computer-readable instructions are also novel and useful. A communication system including the communication device and the portable terminal is also novel and useful.

BRIEF DESCRIPTION OF THE DRAWINGS

EMBODIMENT (Configuration of Communication System 2; FIG. 1)

Figure 1:
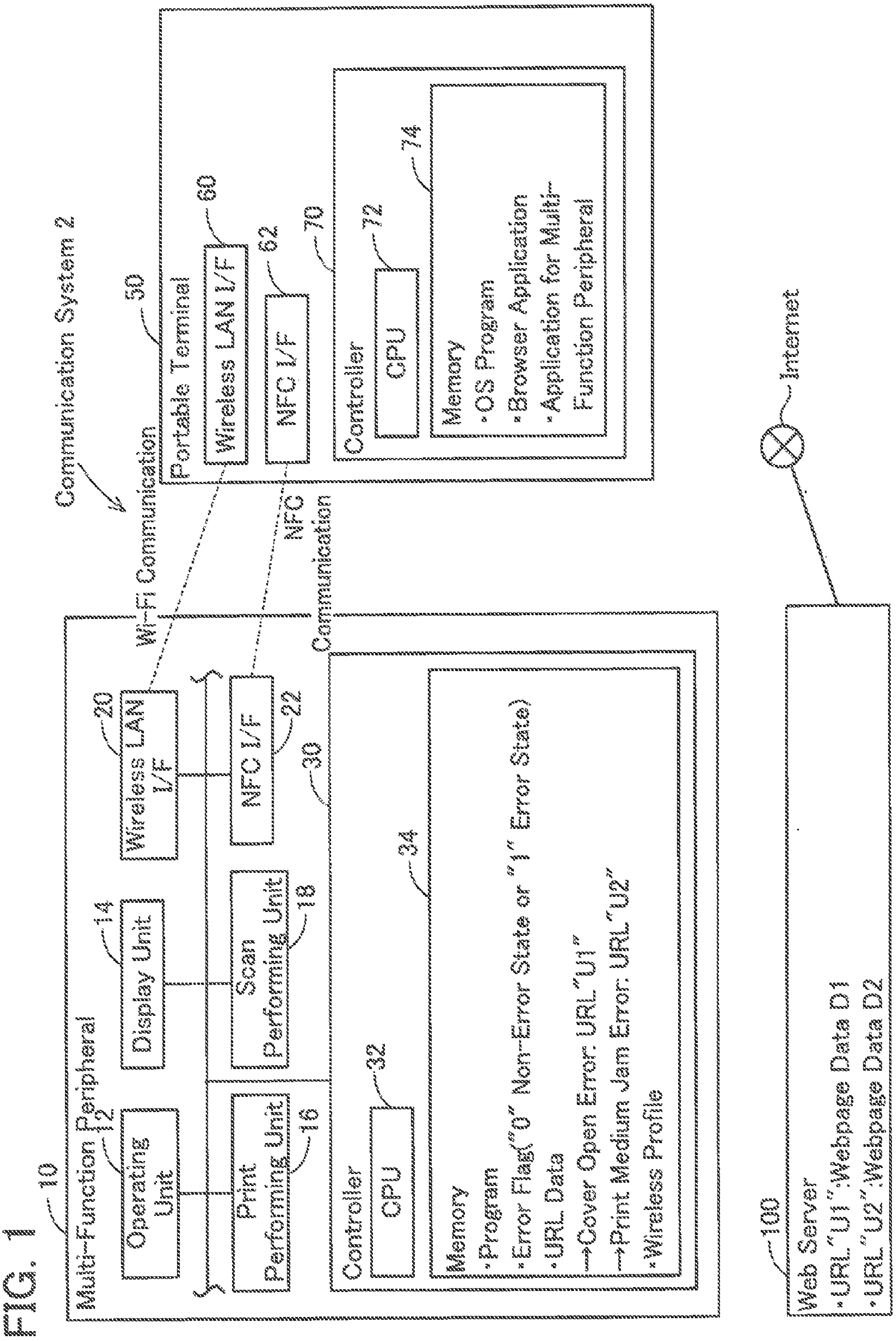
FIG. 1 shows a configuration of a communication system.

As depicted in FIG. 1, a communication system 2 comprises a multi-function peripheral 10, a portable terminal 50, and a web server 100. Each of the multi-function peripheral 10 and the portable terminal 50 can execute a wireless communication of an NFC scheme (i.e., NFC communication) which is a communication scheme of an NFC standard, and a wireless communication of a Wi-Fi (i.e., Wi-Fi communication) scheme which is a communication scheme developed by the Wi-Fi Alliance. The portable terminal 50 can execute the Wi-Fi communication, a 3G communication, etc. so as to access the Internet. The web server 100 is disposed on the Internet.

(Configuration of Multi-Function Peripheral 10)

The multi-function peripheral 10 is a peripheral device (i.e., a peripheral device of a PC (abbreviation of Personal Computer) etc.) capable of executing multiple functions including a print function and a scan function. The multi-function peripheral 10 comprises an operating unit 12, a display unit 14, a print performing unit 16, a scan performing unit 18, a wireless LAN (abbreviation of Local Area Network) interface 20, an NFC interface 22, and a controller 30. The Interface will hereinafter be described as “I/F”.

The operating unit 12 comprises a plurality of keys. A user can operate the operating unit 12 to input various instructions to the multi-function peripheral 10. The display unit 14 is a display for displaying various pieces of information. The print performing unit 16 is a print mechanism of an inkjet type, a laser type, etc. The scan performing unit 18 is a scan mechanism such as a CCD, a CIS, etc.

The wireless LAN I/F 20 is an interface for executing a wireless communication of the Wi-Fi scheme. The Wi-Fi Scheme is, for example, a wireless communication scheme according to the IEEE (abbreviation of the Institute of Electrical and Electronics Engineers, Inc.) 802.11 standard or a standard conforming thereto (e.g., 802.11a, 11b, 11g, or 11n).

More specifically, the wireless LAN I/F 20 supports a WFD (abbreviation of Wi-Fi Direct) scheme developed by the Wi-Fi Alliance Therefore, the controller 30 can execute the Wi-Fi communication via the wireless LAN I/F 20 by using a wireless network (hereinafter referred to as “WFDNW”) of the WFD scheme. Details of the WFD scheme are described in “Wi-Fi Peer-to-Peer (P2P) Technical Specification Version 1.1” defined by the Wi-Fi Alliance Details of the WFD scheme are also disclosed in U.S. Patent Application Publication No. 2013/0260683, which is incorporated herein by reference.

The NFC I/F 22 is an interface for executing a wireless communication of the NFC scheme. The NFC scheme is, for example, a wireless communication scheme according to the international standard ISO/IEC 21481 or ISO/IEC 18092. The NFC I/F 22 is, for example, an I/F having Type A or Type F defined by the NFC forum and supports the P2P (abbreviation of Peer to Peer) mode of the NFC standard. Particularly, the NFC I/F 22 can operate as both a client and a server defined by SNEP (abbreviation of Simple NDEF Exchange Protocol) of the NFC standard. The NDEF is an abbreviation of NFC Data Exchange Format.

The wireless LAN I/F 20 and the NFC I/F 22 are configured by physically different chips. A communication speed of the wireless communication via the wireless LAN I/F 20 (e.g., the maximum communication speed of 11 to 600 Mbps) is faster than a communication speed of the wireless communication via the NFC I/F 22 (e.g., the maximum communication speed of 106 to 424 kbps). A frequency of carrier waves in the wireless communication via the wireless LAN I/F 20 (e.g., 2.4 GHz band, 5.0 GHz band) is different from a frequency of carrier waves in the wireless communication via the NFC I/F 22 (e.g., 13.56 MHz band). The maximum distance of the wireless communication via the wireless LAN I/F 20 (e.g., 100 m) is greater than the maximum distance of the wireless communication via the NFC I/F 22 (e.g., 10 cm).

The controller 30 includes a CPU 32 and a memory 34. The CPU 32 is a processor for executing various processes in accordance with a program stored in the memory 34. The memory 34 stores the program as well as an error flag, URL (abbreviation of Uniform Resource Locator) data, and a wireless profile.

The error flag is a flag indicating “0” or “1”. The error flag “0” indicates that a state of the multi-function peripheral 10 is a non-error state in which no error is occurring in the multi-function peripheral 10. The error flag “1” indicates that a state of the multi-function peripheral 10 is an error state in which an error is occurring in the multi-function peripheral 10.

Various types of errors may occur in the multi-function peripheral 10. Various types of errors are exemplified as follows: (1) a cover open error, a state in which a cover is opened with respect to a housing; (2) a print medium jam error, a state in which a print medium is jammed in a print medium feeder for feeding the print medium to the print performing unit 16; (3) a document jam error, a state in which a document is jammed in an auto document feeder (i.e., ADF) for feeding a document to be scanned to the scan performing unit 18; (4) a medium absence error, a state in which no print medium exists on a medium feed tray; (5) a cartridge error, a state in which, for example, an ink cartridge or a toner cartridge is not mounted on the multi-function peripheral 10 or a state in which a coloring material in a mounted cartridge runs out; (6) a memory full error, a state in which a remaining capacity in the memory 34 is less than a predetermined value.

The URL data includes, for each of the above plural types of errors, an association of an error code of the type of error and a URL. The URL is information indicating a position within the web server 100. The URL corresponding to the cover open error and the URL corresponding to the print medium jam error are “U1” and “U2”, respectively.

The wireless profile is wireless setting information used in the WFDNW and includes an SSID, an authentication scheme, an encryption scheme, and a password. The SSID is an identifier for identifying the WFDNW. The authentication scheme, the encryption scheme, and the password are information used in authentication and encryption executed in the WFDNW. When powered on, the CPU 32 transits the multi-function peripheral 10 to a G/O (abbreviation of Group Owner) state of the WFD scheme so as to form the WFDNW. At this timing, the CPU 32 prepares the wireless setting information used in the WFDNW and stores the information in the memory 34.

(Configuration of Portable Terminal 50)

The portable terminal 50 is a portable type terminal device such as a portable telephone (e.g., smartphone), a PDA, a notebook PC, a tablet PC, a portable music player, and a portable video player, for example. The portable terminal 50 comprises a wireless LAN I/F 60, an NFC I/F 62, and a controller 70.

The wireless LAN I/F 60 and the NFC I/F 62 are the same as the wireless LAN I/F 20 and the NFC I/F 22, respectively, of the multi-function peripheral 10. The controller 70 comprises a CPU 72 and a memory 74. The CPU 72 is a processor for executing various processes in accordance with a program (such as an OS (abbreviation of Operation System) program described later) stored in the memory 74. The memory 74 stores the OS program, a browser application, and an application for multi-function peripheral. Application will hereinafter be abbreviated as “appl.” The appl. for multi-function peripheral will be described as “MFP appl.”

In this embodiment, the OS program is Android (registered trademark). The browser appl. is a program for interpreting and displaying webpage data of the HTML (abbreviation of Hyper Text Markup Language) format provided from a web server (e.g., 100) on the Internet. The MFP appl. is a program for causing the multi-function peripheral 10 to execute at least one of the print function and the scan function, for example. The MFP appl. may be installed from a server on the Internet to the portable terminal 50 or may be installed from a medium shipped along with the multi-function peripheral 10 to the portable terminal 50.

(Configuration of Web Server 100)

The web server 100 is a server provided by a vendor of the multi-function peripheral 10. The web server 100 stores, for each of the plural types of errors that may occur in the multi-function peripheral 10, an association of webpage data D1, D2, etc indicating a method for eliminating the error and the URL "U1", "U2" etc. indicating a position of the webpage data. Specifically, the webpage date D1 corresponding to the URL "U1" represents a webpage describing a method for eliminating the cover open error of the multi-function peripheral 10. The webpage date D2 corresponding to the URL "U2" represents a webpage describing a method for eliminating the print medium jam error of the multi-function peripheral 10.

Figure 2:
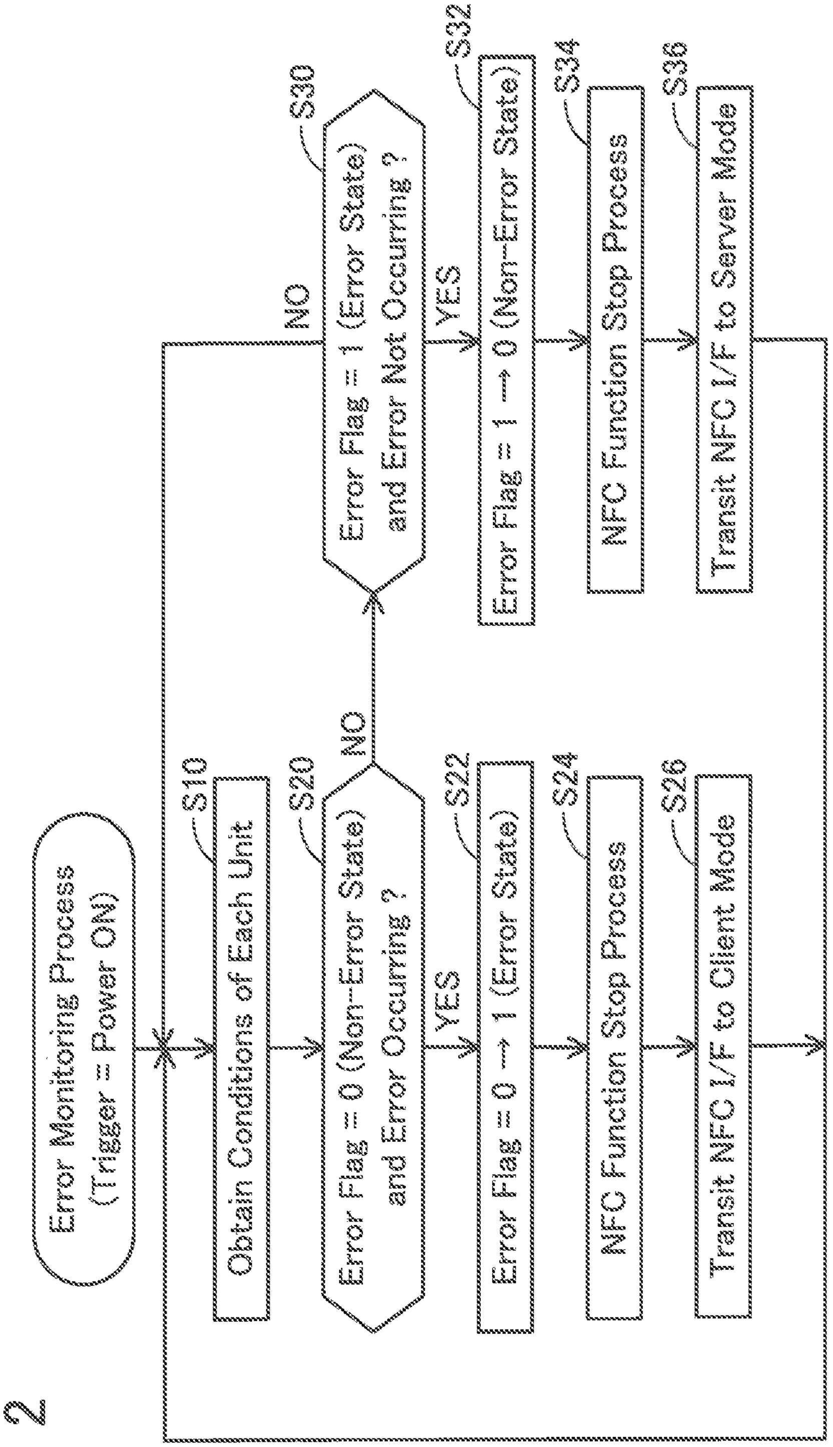
FIG. 2 shows a flow chart of an error monitoring process of a multi-function peripheral.

(Error Monitoring Process; FIG. 2)

Details of an error monitoring process executed by the CPU 32 of the multi-function peripheral 10 will be described with reference to FIG. 2. The error monitoring process is started as a trigger when the multi-function peripheral 10 is powered on.

At S10, the CPU 32 obtains, from each unit (i.e., hardware) configuring the multi-function peripheral 10, each signal indicating a condition of the each unit. For example, the CPU 32 obtains a signal from each of the cover, the print performing unit 16, the scan performing unit 18, the print medium feeder, the document feeder, and the memory 34 etc.

At S20, the CPU 32 determines whether the error flag in the memory 34 indicates "0" while the multi-function peripheral 10 is in the error state. If at least one signal of the signals obtained from the each unit at S10 indicates an error, the CPU 32 determines that the multi-function peripheral 10 is in the error state and, if none of the signals indicates an error, the CPU 32 determines that the multi-function peripheral 10 is in the non-error state. If the error flag indicates "0" while the multi-function peripheral 10 is in the error state (i.e., if the multi-function peripheral 10 transits from the non-error state to the error state), the CPU 32 determines YES at S20 and proceeds to S22. On the other hand, if the error flag indicates "1" or if the multi-function peripheral 10 is in the non-error state, the CPU 32 determines NO at S20 and proceeds to S30.

At S22, the CPU 32 changes the error flag in the memory 34 from "0" to "1". At S24, the CPU 32 supplies the NFC I/F 22 with a command for temporarily stopping a function for the NFC communication. In this case, the NFC I/F 22 temporarily stops all the functions for the NFC communication (e.g., receiving and sending of signals for establishing a connection). This enables the NFC I/F 22 to appropriately operate in accordance with an operation mode (i.e., client mode) after S26.

At S26, the CPU 32 supplies the NFC I/F 22 with a mode change instruction from a server mode to a client mode. In this case, the NFC I/F 22 changes the operation mode of the NFC I/F 22 from the server mode to the client mode. The server mode is a mode for causing the NFC I/F 22 to execute the server operation of the SNEP, and then to execute the client operation of the SNEP. The client mode is a mode for causing the NFC I/F 22 to execute only the client mode of the SNEP among the server operation of the SNEP and the client operation of the SNEP. The server operation of the SNEP is an operation in which the NFC I/F 22 receives information from an external device (e.g., the portable terminal 50) so as to supply the information to the controller 30 (i.e., the CPU 32). The client operation of the SNEP is an operation in which the NFC I/F 22 obtains information from the controller 30 (i.e., the CPU 32) so as to send the information to an external device (e.g., the portable terminal 50). Even if information is received from an external device in the client mode, the NFC I/F 22 does not supply the information to the controller 30 (i.e., the CPU 32). After the end of S26, the CPU 32 returns to S10.

At S30, the CPU 32 determines whether the error flag in the memory 34 indicates "1" while the multi-function peripheral 10 is in the non-error state. If the error flag indicates "1" while the multi-function peripheral 10 is in the non-error state (i.e., if the multi-function peripheral 10 transits from the error state to the non-error state), the CPU 32 determines YES at S30 and proceeds to S32. On the other hand, if the error flag indicates "0" or if the multi-function peripheral 10 is in the error state, the CPU 32 determines NO at S30 and returns to S10.

At S32, the CPU 32 changes the error flag in the memory 34 from "1" to "0". S34 is the same as S24. This enables the NFC I/F 22 to appropriately operate in accordance with an operation mode (i.e., server mode) after S36. At S36, the CPU 32 supplies the NFC I/F 22 with a mode change instruction from the client mode to the server mode. In this case, the NFC I/F 22 changes the operation mode of the NFC I/F 22 from the client mode to the server mode. After the end of S36, the CPU 32 returns to S10.

Figure 3:
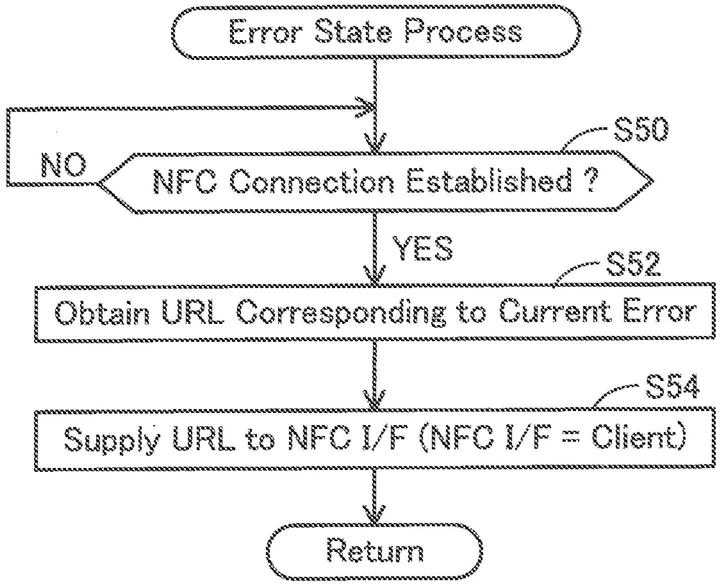
FIG. 3 shows a flow chart of an error state process of the multi-function peripheral.

(Error State Process; FIG. 3)

Details of an error state process executed by the CPU 32 of the multi-function peripheral 10 will be described with reference to FIG. 3. The error state process is executed while the multi-function peripheral 10 is in the error state, i.e., while the error flag in the memory 34 is "1". In other words, the error state process is executed while the operation mode of the NFC I/F 22 is the client mode.

At S50, the CPU 32 monitors that a connection according to the NFC scheme (hereinafter referred to as an "NFC connection") is established between the NFC I/F 22 of the multi-function peripheral 10 and the NFC I/F 62 of the portable terminal 50. The NFC I/F 22 of the multi-function peripheral 10 periodically sends a request signal for establishing the NFC connection to the outside. Similarly, the NFC I/F 62 of the portable terminal 50 periodically sends the request signal to the outside. If a distance between a pair of NFC I/Fs 22, 62 becomes equal to or less than the maximum distance (e.g., 10 cm) of the NFC communication, one NFC I/F receives the request signal from the other NFC I/F so as to send a response signal to the other NFC I/F. As a result, an NFC connection is established between the pair of NFC I/Fs 22, 62. In this case, the NFC I/F 22 of the multi-function peripheral 10 supplies the controller 30 with information indicating an establishment of the NFC connection. As a result, the CPU 32 determines YES at S50 and proceeds to S52.

At S52, the CPU 32 obtains a URL corresponding to the error currently occurring in the multi-function peripheral 10 from the URL data (see FIG. 1) in the memory 34. If two or more types of errors are simultaneously occurring in the multi-function peripheral 10, the CPU 32 obtains a URL corresponding to one type of the error with the highest priority (i.e., the error that should be eliminated at the earliest time) depending on a predefined priority.

At S54, the CPU 32 supplies the obtained URL to the NFC I/F 22. Since the operation mode of the NFC I/F 22 is the client mode, the NFC I/F 22 sends the URL obtained from the CPU 32 to the portable terminal 50 (i.e., executes the client operation of the SNEP). Therefore, at S54, the CPU 32 causes the NFC I/F 22 to operate as a client of the SNEP and sends the URL to the portable terminal 50 by using the NFC connection established at S50. After the end of S54, the CPU 32 returns to S50.

Figure 4:
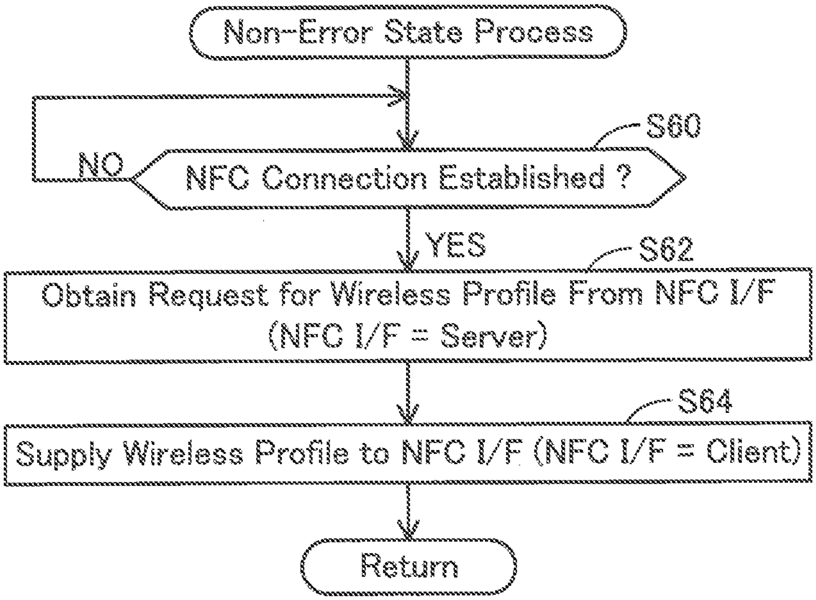
FIG. 4 shows a flow chart of a non-error state process of the multi-function peripheral.

(Non-Error State Process; FIG. 4)

Details of a non-error state process executed by the CPU 32 of the multi-function peripheral 10 will be described with reference to FIG. 4. The non-error state process is executed while the multi-function peripheral 10 is in the non-error state, i.e., while the error flag in the memory 34 is "0". In other words, the non-error state process is executed while the operation mode of the NFC I/F 22 is the server mode.

S60 is the same as S50 of FIG. 3. If the NFC connection is established, the CPU 32 determines YES at S60 and proceeds to S62.

At S62, the CPU 32 obtains a request for wireless profile from the NFC I/F 22. As described above, in the error state process of FIG. 3, even if a request is not received from the portable terminal 50 after the NFC connection is established, the CPU 32 supplies the NFC I/F 22 with the URL to be sent to the portable terminal 50 (S54 of FIG. 3). In contrast, in the non-error state process of FIG. 4, the CPU 32 does not supply the NFC I/F 22 with information to be sent to the portable terminal 50 until a request is received from the portable terminal 50. Since the operation mode of the NFC I/F 22 is the server mode, if the request for wireless profile is received from the portable terminal 50, the NFC I/F 22 supplies the request to the controller 30 (i.e., executes the server operation of the SNEP). That is, at S62, the CPU 32 causes the NFC I/F 22 to operate as a server of the SNEP and receives the request for wireless profile from the portable terminal 50 by using the NFC connection established at S60.

At S64, the CPU 32 obtains the wireless profile from the memory 34 so as to supply the wireless profile to the NFC I/F 22. As a result, the NFC I/F 22 obtains the wireless profile from the controller 30 so as to send the wireless profile to the portable terminal 50 (i.e., executes the client operation of the SNEP). That is, at S64, the CPU 32 causes the NFC I/F 22 to operate as a client of the SNEP and sends the wireless profile to the portable terminal 50 by using the NFC connection established at S60. After the end of S64, the CPU 32 returns to S60.

Figure 5:
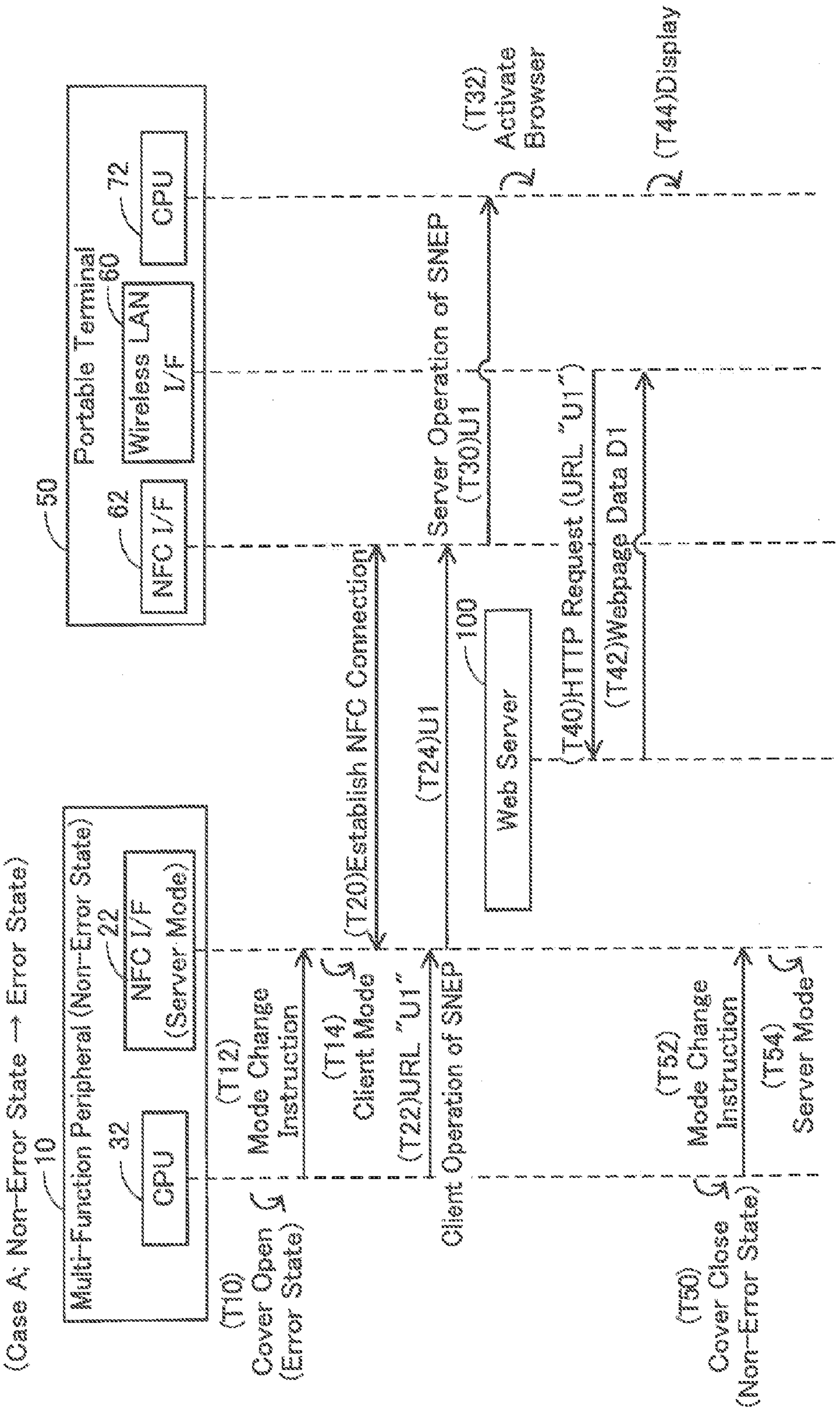
FIG. 5 shows a sequence chart of Case A in which an NFC connection is established under a circumstance where the multi-function peripheral is in an error state.

(Case A; FIG. 5)

Case A implemented by the processes of FIGS. 2 to 4 will be described. In the initial state of Case A, the multi-function peripheral 10 is in the non-error state and the operation mode of the NFC I/F 22 is the server mode.

At T10, the cover open error occurs in the multi-function peripheral 10 due to opening of the cover of the multi-function peripheral 10 by a user. In this case, at T12, the CPU 32 of the multi-function peripheral 10 supplies the mode change instruction to the NFC I/F 22 (YES at S20, and S22 to S26 of FIG. 2). As a result, at T14, the NFC I/F 22 transits from the server mode to the client mode.

The user then brings the portable terminal 50 closer to the multi-function peripheral 10. As a result, at T20, the NFC connection is established between the NFC I/F 22 of the multi-function peripheral 10 and the NFC I/F 62 of the portable terminal 50 (YES at S50 of FIG. 3).

At T22, the CPU 32 of the multi-function peripheral 10 supplies the URL "U1" (see FIG. 1) corresponding to the cover open error to the NFC I/F 22. At T24, the NFC I/F 22 operates as a client of the SNEP and sends the URL "U1" to the portable terminal 50 by using the NFC connection of T20.

At the time point of T24, none of appls. including the browser appl. and the MFP appl. is activated in the portable terminal 50. In this case, the CPU 72 of the portable terminal 50 causes the NFC I/F 62 to execute the server operation of the SNEP in accordance with the OS program. Therefore, at T30, the NFC I/F 62 supplies the CPU 72 with the URL "U1" received from the multi-function peripheral 10. As a result, at T32, the CPU 72 automatically activates the browser appl. even without an instruction given from the user.

At T40, the CPU 72 (i.e., browser appl.) of the portable terminal 50 sends an HTTP (abbreviation of Hyper Text Transfer Protocol) request including the URL "U1" via the wireless LAN I/F 60 to the web server 100. As a result, at T42, the CPU 72 receives the webpage data D1 (see FIG. 1) corresponding to the URL "U1" via the wireless LAN I/F 60 from the web server 100. At T44, the CPU 72 (i.e., browser appl.) causes a display unit (not depicted) of the portable terminal 50 to display a webpage represented by the webpage data D1.

When viewing the webpage displayed at T44, the user can know a method for eliminating the cover open error (e.g., which cover is closed in what manner). Therefore, the user executes the operation for eliminating the cover open error in the multi-function peripheral 10. As a result, at T50, the cover open error is eliminated in the multi-function peripheral 10 due to closing of the cover of the multi-function peripheral 10 by the user. In this case, at T52, the CPU 32 of the multi-function peripheral 10 supplies a mode change instruction to the NFC I/F 22 (YES at S30, and S32 to S36 of FIG. 2). As a result, at T54, the NFC I/F 22 transits from the client mode to the server mode.

Assuming that the print medium jam error occurs at T10: a communication of the URL "U2" is executed at T22, T24, and T30; a communication of an HTTP request including the URL "U2" is executed at T40; and a communication of the webpage data D2 is executed at T42. As a result, a webpage describing a method for eliminating the print medium jam error is displayed at T44, and the print medium jam error is eliminated at T50.

Figure 6:
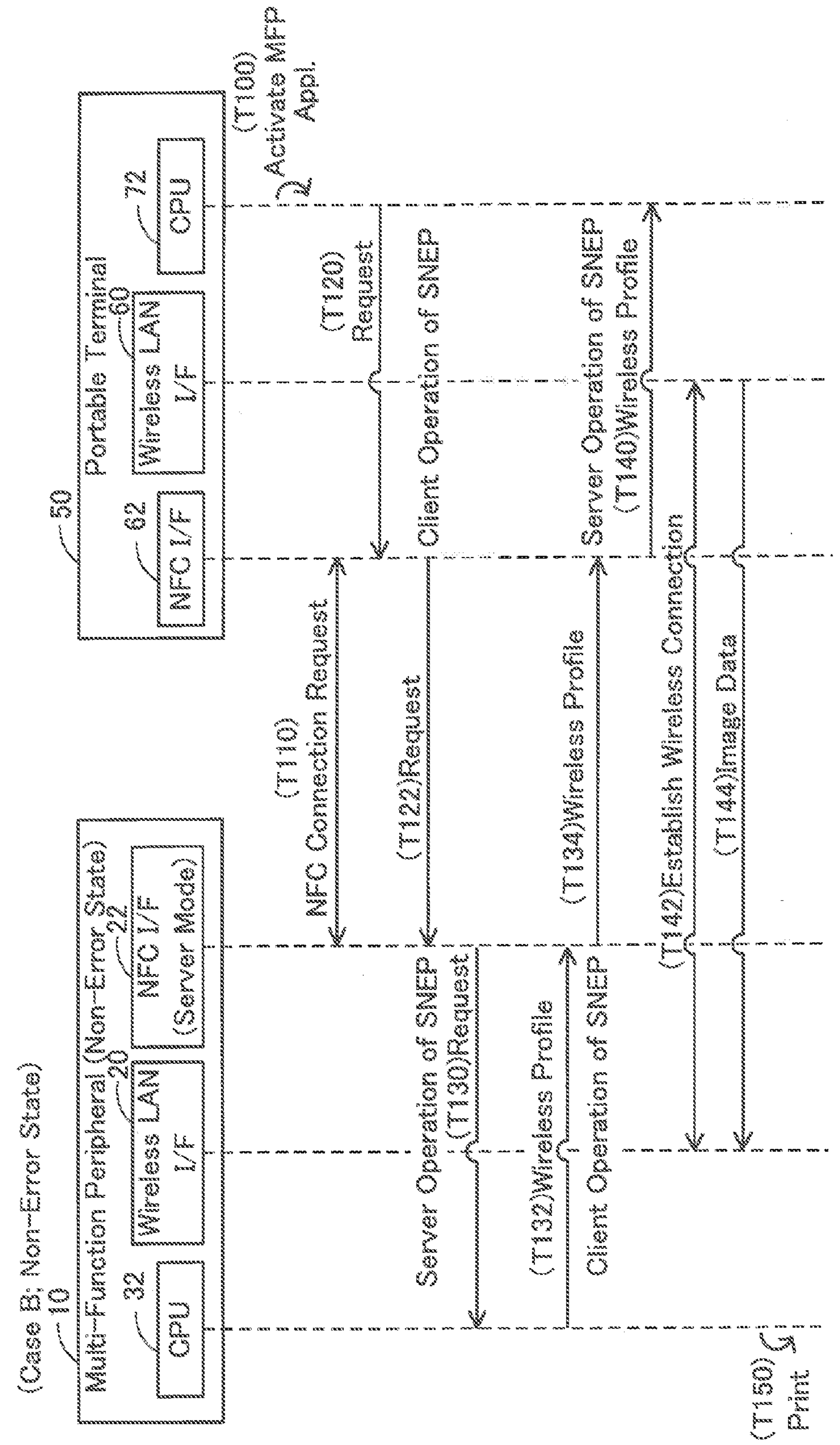
FIG. 6 shows a sequence chart of Case B in which an NFC connection is established under a circumstance where the multi-function peripheral is in a non-error state.

(Case B; FIG. 6)

Case B implemented by the processes of FIGS. 2 to 4 will be described. The initial state of Case B is the same as the initial state of Case A of FIG. 5. In Case B, a user utilizes the MFP appl. of the portable terminal 50 to cause the multi-function peripheral 10 to print an image represented by image data stored in the portable terminal 50.

At T100, the CPU 72 of the portable terminal 50 activates the MFP appl. due to an instruction given from the user. The user brings the portable terminal 50 closer to the multi-function peripheral 10. As a result, at T110, the NFC connection is established between the NFC I/F 22 of the multi-function peripheral 10 and the NFC I/F 62 of the portable terminal 50 (YES at S60 of FIG. 3).

At T120, the CPU 72 (i.e., the MFP appl.) of the portable terminal 50 supplies a request for wireless profile to the NFC I/F 62. As a result, at T122, the NFC I/F 62 operates as a client of the SNEP so as to send the request for wireless profile to the multi-function peripheral 10 by using the NFC connection of T110.

At T130, the NFC I/F 22 of the multi-function peripheral 10 operates as a server of the SNEP so as to supply the CPU 32 with the request for wireless profile received from the portable terminal 50. As a result, the CPU 32 obtains the request for wireless profile (S62 of FIG. 4).

At T132, the CPU 32 of the multi-function peripheral 10 supplies the wireless profile in the memory 34 to the NFC I/F 22 (S64 of FIG. 4). As a result, at T134, the NFC I/F 22 operates as a client of the SNEP so as to sends the wireless profile to the portable terminal 50 by using the NFC connection of T110.

At T140, the NFC I/F 62 of the portable terminal 50 operates as a server of the SNEP so as to supply the CPU 72 with the wireless profile received from the multi-function peripheral 10. In this case, at T142, the CPU 72 (i.e., the MFP appl.) uses the wireless profile to execute various communications for establishing a wireless connection with the multi-function peripheral 10 via the wireless LAN I/F 60. These communications include, for example, a sending of a Probe Request signal including the SSID in the wireless profile, and a communicating of authentication using the password etc. in the wireless profile. As a result, a wireless connection according to the Wi-Fi scheme is established between the LAN I/F 20 of the multi-function peripheral 10 and the wireless LAN I/F 60 of the portable terminal 50. Therefore, the portable terminal 50 can transit to a CL (abbreviation of Client) state of the WED scheme so as to join to the WFDNW in which the multi-function peripheral 10 operates in the G/O state.

At T144, the CPU 72 (i.e., the MFP appl.) of the portable terminal 50 sends the image data via the wireless LAN I/F 60 to the multi-function peripheral 10 by using the WFDNW (i.e., by using the wireless connection of T140). The image data is, for example, image data designated as a print target by the user from among a plurality of image data stored in the memory 74 of the portable terminal 50.

The CPU 32 of the multi-function peripheral 10 receives the image data via the wireless LAN I/F 20 from the portable terminal 50 by using the WFDNW. In this case, at T150, the CPU 32 uses the image data received from the portable terminal 50 so as to cause the print performing unit 16 to print an image represented by the image data.

As described above, in Case B, the multi-function peripheral 10 sends the wireless profile to the portable terminal 50 by using the NFC connection of T110 (T134). As a result, the wireless connection of T142 is established between the multi-function peripheral 10 and the portable terminal 50, and the portable terminal 50 sends the image data to the multi-function peripheral 10 by using the wireless connection of T142 (T144). Alternatively, it is conceivable that the portable terminal 50 sends the image data to the multi-function peripheral 10 by using the NFC connection of T110 in another configuration. However, a communication speed of the wireless communication via the NFC I/F 22 is slower than a communication speed of the wireless communication via the wireless LAN I/F 20. Thus, if the above configuration is employed, since the communication of the image data takes time, a printed material cannot quickly be provided to a user. In this regard, although the wireless profile is sent by using the NFC connection of T110 in this embodiment, since a data size of the wireless profile is smaller than the image data, the communication of the wireless profile can be done in a short time. Subsequently, the image data is communicated at a high speed by using the wireless connection of T142. Therefore, a printed material can quickly be provided to a user.

The user of the portable terminal 50 may utilize the MFP appl. to cause the multi-function peripheral 10 to scan a document. In this case, the CPU 72 of the portable terminal 50 sends a scan execution instruction at T144 instead of the image data. In this case, the CPU 32 of the multi-function peripheral 10 causes the scan performing unit 18 so as to scan the document, thereby generating scan data. The CPU 32 then sends the scan data to the portable terminal 50 by using the wireless connection of T142.

(Effect of Embodiment)

As described in Case A of FIG. 5, in a case where the NFC connection is established with the portable terminal 50 under a circumstance where the multi-function peripheral 10 is in the error state (T20), the multi-function peripheral 10 sends the URL "U1" to the portable terminal 50 by using the NFC connection (T24). As a result, the multi-function peripheral 10 can cause the portable terminal 50 to execute the operation (T40 to T44) for displaying the webpage describing the method for eliminating the cover open error. Further, as described in Case B of FIG. 6, in a case where the NFC connection is established with the portable terminal 50 under a circumstance where the multi-function peripheral 10 is in the non-error state (T110), the multi-function peripheral 10 sends the wireless profile to the portable terminal 50 by using the NFC connection (T134). As a result, the multi-function peripheral 10 can cause the portable terminal 50 to execute the operation (T140 to T144) for sending the image data. As described above, the multi-function peripheral 10 can send appropriate information to the portable terminal 50 depending on whether the multi-function peripheral 10 is in the error state or the non-error state by using the NFC communication, and can consequently cause the portable terminal 50 to execute an appropriate operation depending on whether the multi-function peripheral 10 is in the error state or the non-error state.

(First Comparison Example)

In the present embodiment, the NFC I/F 22 operates in the client mode while the multi-function peripheral 10 is in the error state (S26 of FIG. 3) and the NFC I/F 22 operates in the server mode while the multi-function peripheral 10 is in the non-error state (S36). Alternatively, in a first comparison example, the operation mode of the NFC I/F 22 is maintained in the server mode regardless of whether the multi-function peripheral 10 is in the error state or the non-error state. In this case, the multi-function peripheral 10 cannot send information to the portable terminal 50 unless a request is received from the portable terminal 50. Therefore, in the first comparison example, if a request for URL is received from the portable terminal 50, the multi-function peripheral 10 sends the URL to the portable terminal 50 and, if a request for wireless profile is received from the portable terminal 50, the multi-function peripheral 10 sends the wireless profile to the portable terminal 50. Thus, in the first comparison example, a special arrangement (e.g., special appl.) must be installed on the portable terminal 50 for sending a request for URL to the multi-function peripheral 10.

In contrast, in the present embodiment, since the NFC I/F 22 operates in the client mode while the multi-function peripheral 10 is in the error state, the multi-function peripheral 10 can send the URL to the portable terminal 50 without receiving a request from the portable terminal 50 (T22, T24 of FIG. 5). When the URL is received from the multi-function peripheral 10, the OS program (e.g., Android (registered trademark)) of the portable terminal 50 automatically activates the browser appl. so as to access the webpage (T30 to T44). Therefore, the webpage describing the method for eliminating the error can be displayed on the portable terminal 50 without installing a special arrangement on the portable terminal 50.

For example, it is conceivable that the special arrangement is installed on the MFP appl. of the portable terminal 50 in the first comparison example. In this case, since the MFP appl. becomes complicated, it takes time to make the MFP appl., and the MFP appl. must always be installed in the portable terminal 50 so as to display the webpage describing the method for eliminating the error on the portable terminal 50. In contrast, in the present embodiment, since it is not necessary to install the special arrangement on the MFP appl., the MFP appl. can be inhibited from being complicated. Additionally, in the present embodiment, even if the portable terminal 50 does not include the MFP appl., the webpage describing the method for eliminating the error can be displayed on the portable terminal 50 as long as the portable terminal 50 includes the OS program and the browser appl.

(Second Comparison Example)

In a second comparison example, the operation mode of the NFC I/F 22 is maintained in the client mode regardless of whether the multi-function peripheral 10 is in the error state or the non-error state. If the NFC connection is established under a circumstance where the multi-function peripheral 10 is in the error state, the CPU 32 of the multi-function peripheral 10 supplies a URL to the NFC I/F 22 (i.e., sends the URL to the portable terminal 50) and, if the NFC connection is established under a circumstance where the multi-function peripheral 10 is in the non-error state, the CPU 32 supplies a wireless profile to the NFC I/F 22 (i.e., sends the wireless profile to the portable terminal 50). However, in the second comparison example, if the NFC connection is established under the circumstance where the multi-function peripheral 10 is in the non-error state, the CPU 32 of the multi-function peripheral 10 sends the wireless profile to the portable terminal 50 even when a request for the wireless profile is not received from the portable terminal 50. Therefore, even when the MFP appl. is not activated in the portable terminal 50, the wireless profile is sent from the multi-function peripheral 10 to the portable terminal 50. Since the MFP appl. is not activated in the portable terminal 50, even when the wireless profile is received from the multi-function peripheral 10, the portable terminal 50 cannot interpret the wireless profile and does not execute the operation corresponding to the wireless profile. Therefore, in the second comparison example, unnecessary information which is uninterpretable for the portable terminal 50 may be sent from the multi-function peripheral 10 to the portable terminal 50. If such unnecessary information is given to the portable terminal 50, the operation of the portable terminal 50 may become unstable.

In contrast, in the present embodiment, since the NFC I/F 22 operates in the server mode while the multi-function peripheral 10 is in the non-error state, the multi-function peripheral 10 can sent the wireless profile to the portable terminal 50 in response to receiving the request from the portable terminal 50 (T130 to T134 of FIG. 6). Therefore, the multi-function peripheral 10 can send the wireless profile to the portable terminal 50 only while the MFP appl. is in active in the portable terminal 50. Thus, the unnecessary information which is uninterpretable for the portable terminal 50 is inhibited from being given from the multi-function peripheral 10 to the portable terminal 50.

(Correspondence)

The multi-function peripheral 10 is an example of a "communication device". The NFC I/F 22 and the wireless LAN I/F 20 are examples of a "first interface" and a "second interface", respectively. The NFC connection of T20 of FIG. 5 and the NFC connection of T110 of FIG. 6 are examples of a "first connection" and a "second connection", respectively. The URL of T24 and the wireless profile of T134 of FIG. 5 are examples of "related information" and "different information", respectively. The cover open error and the print medium jam error are examples of a "first error" and a "second error", respectively. The URL "U1" and the URL "U2 are examples of a "first type of related information" and a "second type of related information", respectively. The server mode and the client mode are examples of a "first mode" and a "second mode", respectively.

(Variation 1)

The multi-function peripheral 10 may execute the operation of the first comparison example. In particular, the multi-function peripheral 10 may maintain the operation mode of the NFC I/F 22 in the server mode, and may send the URL to the portable terminal 50 if a request for URL is received from the portable terminal 50, and may send the wireless profile to the portable terminal 50 if a request for wireless profile is received from the portable terminal 50. Generally speaking, the sending of the related information may be performed without receiving a request from the portable terminal and may be performed in response to receiving a request from the portable terminal.

(Variation 2)

The multi-function peripheral 10 may execute the operation of the second comparison example. In particular, the multi-function peripheral 10 may maintain the operation mode of the NFC I/F 22 in the client mode, and may send the URL to the portable terminal 50 without receiving a request from the portable terminal 50 if the NFC connection is established under a circumstance where the multi-function peripheral 10 is in the error state, and may send the wireless profile to the portable terminal 50 without receiving a request from the portable terminal 50 if the NFC connection is established under a circumstance where the multi-function peripheral 10 is in the non-error state. Generally speaking, the sending of the different information may be performed without receiving a request from the portable terminal and may be performed in response to receiving a request from the portable terminal.

(Variation 3)

In the embodiment, the NFC I/F 22 of the multi-function peripheral 10 and the NFC I/F 62 of the portable terminal 50 execute the server operation of the SNEP and the client operation of the SNEP for execution of a communication in accordance with the P2P mode of the NFC standard. Alternatively, the NFC I/Fs 22 and 62 may execute communications of the following (Variation 3-1) to (Variation 3-4) according to anther mode (i.e., a CE (abbreviation of Card Emulation) mode or an R/E (abbreviation of Reader/Writer) mode) of the NFC standard. Generally speaking, the "communication device" may execute a communication with the portable terminal in accordance with the P2P mode of the NFC standard as in the embodiment or may execute a communication with the portable terminal in accordance with another mode of the NFC standard as in this variation.

(Variation 3-1)

At S26 of FIG. 2, the CPU 32 may cause the NFC I/F 22 to operate in the CE mode. In this case, if the portable terminal 50 operates in the Reader mode, the CPU 32 can send the URL to the portable terminal 50 at S54 of FIG. 3. At S64 of FIG. 3, the CPU 32 may cause the NFC I/F 22 to operate in the CE mode. In this case, if the portable terminal 50 operates in the Reader mode, the CPU 32 can send the wireless profile to the portable terminal 50.

(Variation 3-2)

At S26 of FIG. 2, the CPU 32 may cause the NFC I/F 22 to operate in the Writer mode. In this case, if the portable terminal 50 operates in the CE mode, the CPU 32 can send the URL to the portable terminal 50 at S54 of FIG. 3. At S64 of FIG. 3, the CPU 32 may cause the NFC I/F 22 to operate in the Writer mode. In this case, if the portable terminal 50 operates in the CE mode, the CPU 32 can send the wireless profile to the portable terminal 50.

(Variation 3-3)

At S36 of FIG. 2, the CPU 32 may cause the NFC I/F 22 to operate in the CE mode. In this case, if the portable terminal 50 operates in the Writer mode, the CPU 32 can receive the request for wireless profile from the portable terminal 50 at S62 of FIG. 3.

(Variation 3-4)

At S36 of FIG. 2, the CPU 32 may cause the NFC I/F 22 to operate in the Reader mode. In this case, if the portable terminal 50 operates in the CE mode, the CPU 32 can receive the request for wireless profile from the portable terminal 50 at S62 of FIG. 3.

(Variation 4)

In the embodiment and Variation 3 descried above, the NFC I/F 22 is an I/F called NFC forum device and can operate in one of three modes (P2P, R/W, and CE) of the NFC standard. Alternatively, the NFC I/F 22 may be an I/F called NFC forum tag acting only as an IC tag. Particularly, the NFC I/F 22 may be an I/F allowing writing of information and reading of information from the CPU 32 of the host side (i.e., the multi-function peripheral 10). In this case, for example, if the multi-function peripheral 10 transits from the non-error state to the error state, the CPU 32 writes the URL to the NFC I/F 22. As a result, if the portable terminal 50 operates in the Reader mode, the NFC I/F 22 can send the URL to the portable terminal 50. For example, if the multi-function peripheral 10 transits from the error state to the non-error state, the CPU 32 erases the URL written to the NFC I/F 62. As a result, if the portable terminal 50 operates in the Writer mode, the NFC I/F 22 can receive the request for wireless profile from the portable terminal 50. The CPU 32 reads the request for wireless profile from the NFC I/F 22 and then writes the wireless profile to the NFC I/F 22. As a result, if the portable terminal 50 operates in the Reader mode, the NFC I/F 22 can send the wireless profile to the portable terminal 50. Generally speaking, the "first interface" may be any interface for executing a wireless communication of the NFC scheme.

(Variation 5)

In the embodiment, at S52 and S54 of FIG. 3, the CPU 32 of the multi-function peripheral 10 sends the URL of the webpage describing the method for eliminating the error occurring in the multi-function peripheral 10 to the portable terminal 50. Alternatively, any of the following (Variation 5-1) to (Variation 5-3) may be employed. Generally speaking, the "related information" may be any information related to the error state.

(Variation 5-1)

The CPU 32 may send a text describing the method for eliminating the error to the portable terminal 50. In this case, the portable terminal 50 only needs to display the text and is not required to access the web server 100. In this variation, the text is an example of the "related information".

(Variation 5-2)

The CPU 32 may send a text describing a type of the error without describing the method for eliminating the error to the portable terminal 50. In this variation, the text is an example of the "related information".

(Variation 5-3)

Instead of a URL indicating a position within the web server 100 (hereinafter referred to as a "first URL"), the CPU 32 may send a URL indicating a position in another server (hereinafter referred to as a "second URL") to the portable terminal 50. In this case, the portable terminal 50 may access the other server by using the second URL to obtain the first URL from the other server. The portable terminal 50 may then access the web server 100 by using the first URL to obtain the webpage data. In this variation, the second URL is an example of the "related information".

(Variation 6)

In the embodiment, at S62 and S64 of FIG. 4, the CPU 32 of the multi-function peripheral 10 receives the request for wireless profile from the portable terminal 50 and sends the wireless profile to the portable terminal 50. Alternatively, any of the following (Variation 6-1) to (Variation 6-3) may be employed. Generally speaking, the "different information" may be any information different from the "related information".

(Variation 6-1)

It is assumed that the multi-function peripheral 10 belongs to a particular wireless network being formed by an access point. The memory 34 of the multi-function peripheral 10 stores a wireless profile used in the particular wireless network. At S64 of FIG. 4, the CPU 32 may send the wireless profile to the portable terminal 50. As a result, the portable terminal 50 establishes a wireless connection with the access point by using the wireless profile. The multi-function peripheral 10 receives image data via the wireless LAN I/F 20 from the portable terminal 50 by using the particular wireless network (i.e., via the access point). In this variation, the wireless profile used in the particular wireless network is an example of the "different information".

(Variation 6-2)

At S62 of FIG. 4, the CPU 32 may receive authentication information from the portable terminal 50. The authentication information is information used by the multi-function peripheral 10 for accessing to a server on the Internet. At S64, the CPU 32 may send OK information, which indicates that the authentication information has been received, to the portable terminal 50. In this variation, the OK information is an example of the "different information".

(Variation 6-3)

The multi-function peripheral 10 may comprise an I/F for executing a wireless communication of BlueTooth (registered trademark) (hereinafter referred to as a "BT communication"). At S64 of FIG. 4, the CPU 32 may send a wireless profile including a pairing key for executing the BT communication to the portable terminal 50. In this variation, the wireless profile for the BT communication and the I/F for the BT communication are examples of the "different information" and the "second interface", respectively.

(Variation 7)

The "communication device" is not limited to a multi-function peripheral capable of executing the print function and the scan function (i.e., the multi-function peripheral 10) and may be a printer capable of executing only the print function or a scanner capable of executing only the scan function. Alternatively, the "communication device" may be a device (e.g., a PC, a server, or a portable terminal (such as a portable telephone, a smartphone, and a PDA)) executing a function different from the print function and the scan function (e.g., an image display function, a data arithmetic function). That is, the "communication device" includes any devices capable of performing the wireless communication of the NFC scheme.

(Variation 8)

Although the processes of FIGS. 2 to 4 are implemented by software (i.e., program) in the above embodiment, at least one of the processes of FIGS. 2 to 4 may be implemented by hardware such as a logic circuit.

(Variation 9)

The "first interface" is not limited to an NFC I/F and may be an I/F used by executing a wireless communication of TransferJet scheme or BlueTooth (registered trademark). Accordingly, the URL, wireless profile, etc. may be sent to the portable terminal by the TransferJet communication or BlueTooth (registered trademark) communication.

What is claimed is:

1. A communication device comprising:
a first interface used by executing a wireless communication of an NFC (abbreviation of Near Field Communication) scheme according to an NFC standard;
a processor; and
a memory storing computer-readable instructions therein, the computer-readable instructions, when executed by the processor, causing the communication device to perform:
in a case where a first connection via the first interface is established with a portable terminal under a circumstance where the communication device is in an error state, sending related information to the portable terminal by using the first connection via the first interface, the related information being related to the error state; and
in a case where a second connection via the first interface is established with the portable terminal under a circumstance where the communication device is in a non-error state, sending different information to the portable terminal by using the second connection via the first interface, the different information being different from the related information;
in a case where a state of the communication device changes from the non-error state to the error state, modifying an operation mode of the first interface from a first mode to a second mode; and
in a case where a state of the communication device changes from the error state to the non-error state, modifying the operation mode of the first interface from the second mode to the first mode,
wherein:
the first mode is a mode for causing the first interface to execute a first operation, then to execute a second operation,
the second mode is a mode for causing the first interface to execute only the second operation among the first operation and the second operation,
the first operation is an operation in which the first interface receives information from the portable terminal and supplies the received information to the processor, and
the second operation is an operation in which the first interface obtains information from the processor and sends the obtained information to the portable terminal.

2. The communication device as in claim 1, wherein:
in the case where the first connection is established, the sending of the related information is performed without receiving a request from the portable terminal, and
in the case where the second connection is established, the sending of the different information is performed in response to receiving a request from the portable terminal.

3. The communication device as in claim 1, wherein:
the first operation is an operation of a server defined in SNEP (abbreviation of Simple NDEF (abbreviation of NFC Data Exchange Format) Exchange Protocol) of the NFC standard, and
the second operation is an operation of a client defined in the SNEP of the NFC standard.

4. The communication device as in claim 1, wherein
the related information includes a URL (abbreviation of Uniform Resource Locator) used by the portable terminal to display a webpage related to the error state.

5. The communication device as in claim 1, further comprising:
a second interface used by executing a wireless communication of a communication scheme being different from the NFC scheme,
wherein the different information includes a wireless profile used by the communication device and the portable terminal to execute a wireless communication via the second interface.

6. A non-transitory computer-readable medium storing computer-readable instructions for a communication device, the communication device comprising a first interface used by executing a wireless communication of an NFC (abbreviation of Near Field Communication) scheme according to an NFC standard, wherein
the computer-readable instructions, when executed by a processor of the communication device, cause the communication device to perform:
in a case where a first connection via the first interface is established with a portable terminal under a circumstance where the communication device is in an error state due to a first type of error occurring in the communication device, sending a first type of related information to the portable terminal by using the first connection via the first interface, the first type of related information being for displaying a method for eliminating the error state due to the first type of error on the portable terminal;
in a case where the first connection is established under a circumstance where the communication device is in the error state due to a second type of error occurring in the communication device, sending a second type of related information to the portable terminal by using the first connection, the second type of error being different from the first type of error, the second type of related information being different from the first type of related information and being for displaying a method for eliminating the error state due to the second type of error on the portable terminal; and
in a case where a second connection via the first interface is established with the portable terminal under a circumstance where the communication device is in a non-error state, sending different information to the portable terminal by using the second connection via the first interface, the different information being different from the first type of related information and the second type of related information.

7. The non-transitory computer-readable medium as in claim 6, wherein:
in the case where the first connection is established, the sending of the first type of related information and the second type of related information is performed without receiving a request from the portable terminal, and in the case where the second connection is established, the sending of the different information is performed in response to receiving a request from the portable terminal.

8. The non-transitory computer-readable medium as in claim 6, wherein each of the first type of related information and the second type of related information includes a respective URL (abbreviation of Uniform Resource Locator) used by the portable terminal to display a respective webpage related to the respective error state.

9. The non-transitory computer-readable medium as in claim 6, the communication device further comprising a second interface used by executing a wireless communication of a communication scheme being different from an NFC scheme, wherein the different information includes a wireless profile used by the communication device and the portable terminal to execute a wireless communication via the second interface.

10. A communication device comprising:

a first interface used by executing a wireless communication of an NFC (abbreviation of Near Field Communication) scheme according to an NFC standard;

a processor; and a memory storing computer-readable instructions therein, the computer-readable instructions, when executed by the processor, causing the communication device to perform:

in a case where a first connection via the first interface is established with a portable terminal under a circumstance where the communication device is in an error state due to a first type of error occurring in the communication device, sending a first type of related information to the portable terminal by using the first connection, the first type of related information being for displaying a method for eliminating the error state due to the first type of error on the portable terminal;

in a case where the first connection is established under a circumstance where the communication device is in the error state due to a second type of error occurring in the communication device, sending a second type of related information to the portable terminal by using the first connection, the second type of error being different from the first type of error, the second type of related information being different from the first type of related information and being for displaying a method for eliminating the error state due to the second type of error on the portable terminal; and in a case where a second connection via the first interface is established with the portable terminal under a circumstance where the communication device is in a non-error state, sending different information to the portable terminal by using the second connection via the first interface, the different information being different from the first type of related information and the second type of related information.

11. The communication device as in claim 10, wherein:

in the case where the first connection is established, the sending of the first type of related information and the second type of related information is performed without receiving a request from the portable terminal, and in the case where the second connection is established, the sending of the different information is performed in response to receiving a request from the portable terminal.

12. The communication device as in claim 10, wherein each of the first type of related information and the second type of related information includes a URL (abbreviation of Uniform Resource Locator) used by the portable terminal to display a webpage related to the error state.

13. The communication device as in claim 10, further comprising:

a second interface used by executing a wireless communication of a communication scheme being different from the NFC scheme, wherein the different information includes a wireless profile used by the communication device and the portable terminal to execute a wireless communication via the second interface.

* * * * *